(12) United States Patent
Isshiki et al.

(10) Patent No.: US 6,632,018 B2
(45) Date of Patent: Oct. 14, 2003

(54) THERMOCOUPLE-TYPE TEMPERATURE-DETECTING DEVICE

(75) Inventors: Tetsuya Isshiki, Yamato (JP); Takayuki Suzuki, Hiratsuka (JP); Hideki Kita, Fujisawa (JP)

(73) Assignee: Isuzu Motors Ltd., Tokyo (JP)

( * ) Notice: Subject to any disclaimer, the term of this patent is extended or adjusted under 35 U.S.C. 154(b) by 0 days.

(21) Appl. No.: 09/799,501

(22) Filed: Mar. 7, 2001

(65) Prior Publication Data
US 2001/0033599 A1 Oct. 25, 2001

(30) Foreign Application Priority Data
Apr. 24, 2000 (JP) .......................................... 2000-122143

(51) Int. Cl.[7] .............................. G01K 7/04; G01K 1/12; H01L 35/02
(52) U.S. Cl. ........................ 374/179; 374/139; 374/140; 136/234
(58) Field of Search ................................. 374/179, 140, 374/139; 136/232, 234, 230, 233

(56) References Cited

U.S. PATENT DOCUMENTS

| | | | | |
|---|---|---|---|---|
| 1,660,504 A | * | 2/1928 | Grubb | 374/139 |
| 2,463,427 A | * | 3/1949 | Richards | 374/140 |
| 2,466,175 A | * | 4/1949 | Kretsch et al. | 136/230 |
| 2,490,817 A | * | 12/1949 | Klingel | 374/140 |
| 2,706,411 A | * | 4/1955 | Bircher | 374/179 |
| 3,327,531 A | * | 6/1967 | Fraedneck | 374/140 |
| 3,468,780 A | * | 9/1969 | Fischer | 136/234 |
| 3,811,958 A | * | 5/1974 | Maurer | 136/233 |
| 4,778,281 A | * | 10/1988 | Falk | 374/140 |
| 4,796,671 A | * | 1/1989 | Furushima et al. | 374/139 |
| 4,871,263 A | * | 10/1989 | Wilson | 374/139 |
| 5,180,228 A | * | 1/1993 | Tarumi et al. | 374/139 |
| 6,102,565 A | * | 8/2000 | Kita et al. | 374/179 |
| 6,106,150 A | * | 8/2000 | Lindholm et al. | 374/139 |
| 6,190,038 B1 | * | 2/2001 | Kita et al. | 374/140 |

FOREIGN PATENT DOCUMENTS

| | | | | |
|---|---|---|---|---|
| JP | 55006233 A | * | 1/1980 | 374/179 |
| WO | WO-92/02794 A1 | * | 2/1992 | 136/230 |

* cited by examiner

*Primary Examiner*—Diego Gutierrez
*Assistant Examiner*—Mirellys Jagan
(74) *Attorney, Agent, or Firm*—Staas & Halsey LLP

(57) ABSTRACT

A thermocouple-type temperature-detecting device excellent in the temperature measurement responsiveness constituted of an outer protective pipe 1 and an inner protective pipe 2, the outer protective pipe 1 is formed in a laminated layer structure of a 2nd layer 10 made of a ceramic containing molten metal-repelling BN and a 1st layer 11 made of a ceramic, the inner protective pipe 2 is formed of a front protective pipe 3 made of a ceramic having a good heat conductivity and a heat-shielding rear protective pipe 4 extending into the outer protective pipe 1 through an air layer 17, furthermore, the head portion 5 of the front protective pipe 3 is projected from the outer protective pipe 1, and a temperature-sensitive portion 20 of a thermocouple is disposed in the inside of the head portion 5.

12 Claims, 3 Drawing Sheets

Durability of Thermocouple

Responsiveness of Thermocouple

X: heat conductivity of front protective pipe 3
Y: heat conductivity of rear protective pipe 4

THERMOCOUPLE-TYPE TEMPERATURE-DETECTING DEVICE

BACKGROUND OF THE INVENTION

1. Field of the Invention

The present invention relates to a thermocouple-type temperature-detecting device capable of quickly and repeatedly measuring a high temperature of a molten metal such as molten iron, etc.

2. Description of the Prior Art

Hitherto, as a material of a temperature-detecting device using a thermocouple for measuring molten iron of about 1500° C., Pt—Rh having a relatively high melting point and being stable in the air as a thermocouple is used as the element wire and a temperature-detecting element having the structure wherein comprising the Pt—Rh element wire is fixed in a pipe (protective pipe) made of a quartz glass such as alumina-silica fibers, etc., has been used.

However, with such a thermocouple-type temperature-detecting device, after being used for temperature measurement of a molten metal about one or two times at steel making, the correct temperature measurement becomes impossible, therefore such temperature-detecting device is then discarded at the present condition. As the temperature-detecting device cannot be repeatedly used, many thermocouple-type temperature-detecting devices are required, that result in a high cost and inconvenience.

Also, as the material of the protective pipe of a thermocouple-type temperature-detecting device for measuring the temperature of a molten metal, a cermet, silicon nitride, alumina, silicon carbide, etc., are used to prepare the protective pipe and the temperature-detecting device having a structure in that a Pt—Rh wire or a W—Re element wire is inserted inside of the protective pipe is known. However, because the protective pipe of such a thermocouple-type temperature detective device has a poor thermal shock resistance, it is required to carry out a treatment such as pre-heating, etc., to a temperature near the measuring temperature before measuring the temperature.

Also, in Japanese patent application Kokai publication No. 6-160200, an airtight terminal-attached sheath-type thermocouple-type temperature-detecting device is proposed. The temperature-detecting device has a function of not causing a measurement error even when a temperature gradient occurs at the terminal portion by a transient temperature change, etc., and is constituted by inserting a thermocouple element wire composed of different kinds of metal wires, an alumel wire and a chromel wire into a stainless steel-made sheath together with an inorganic insulating material, being insulated each other, and the proximal end of the sheath is air-tightly sealed by an airtight terminal portion.

The thermal shock resistance of the cermet protective pipe has a strength of 1.5 times that of the $Si_3N_4$ protective pipe, and thus when the thermocouple-type temperature-detecting device having the protective pipe made of $Si_3N_4$ is directly dipped in a molten iron of a temperature of at least 1700° C., cracks and the like occur in the protective pipe in a relatively short time and the pipe is broken.

Also, a Pt—Rh thermocouple cannot be used in an inert gas atmosphere, and as the usable temperature in the air, 1500° C. is the limiting temperature. For example, the temperature measurement of molten iron is over the upper limit of the guaranteed temperature, and a correct temperature measurement cannot be performed as well as there is a problem that a temperature to be detected is 1700° C., a temperature near to the melting point, so that the life has to be short.

Furthermore, the thermo electromotive force of the PR thermocouple using the Pt—Rh element wire is small as about 1/15 of that of a constantan.alumel (CA) thermocouple and about 1/7 of that of the tungsten.rhenium (W—Re) thermocouple, whereby there are problems that the PR thermocouple is inferior in the measurement accuracy responsiveness as compared with these thermocouples and the also inferior. Accordingly, in the measurement site, for example, in the case of measuring the temperature of the molten metal in a blast furnace, a worker must be stay at the measurement site, near the blast furnace, for from about 10 to 15 seconds until the temperature of the detective device is stabilized.

The W—Re thermocouple can be used in the air and in an inert gas atmosphere, but as the usable temperature in the air, 400° C. is the limiting temperature however, as the usable temperature in an inert gas atmosphere, 2300° C. is the limiting temperature, that allows the measurement of a high temperature. On the other hand, the W—Re element wire is liable to be oxidized in the air and there is a problem that it cannot be used for the measurement of the temperature of molten iron.

As described above, in thermocouple-type temperature-detecting device of prior art, there is a problem that in the case of dipping in a molten metal of at least 1450° C., by the repeating thermal shock to the protective pipe, in the measurements of several times, the protective pipe is frequently cracked and is broken, whereby the temperature measurement becomes impossible.

Also, because the thermocouple-type temperature-detecting device of prior art has the structure that an alloy element wire is inserted in a protective pipe, there is a problem that air is sometimes collected at the tip portion of the protective pipe, whereby the responsiveness becomes poor and the alloy element wire is liable to be cut.

Also, the thermocouple-type temperature-detecting device of prior art has a problem that in the case of measuring the temperature of a molten metal, molten iron, slag, etc., are attached to the outer surface of the protective pipe to deteriorate the electric heating property and the responsiveness, and lower the durability thereof. Furthermore, there are problems that a molten metal attaches to the Pt—Rh element wire and the protective pipe of the thermocouple, the work of removing the attached molten metal becomes complicated, and also the life of the existing article is the temperature measurement of only about twice and the exchanging work of thermocouple takes a time.

SUMMARY OF THE INVENTION

The present invention has been made for solving the above-described various problems of thermocouple-type temperature-detecting devices of prior art, and an object of the invention is to provide a thermocouple-type temperature-detecting device having a good responsiveness to a temperature measurement, a strong thermal shock resistance, and an improved durability.

1) For the purpose, as a metal element wire, for example, a tungsten-rhenium (W—Re) wire having a melting point of 2,300° C. or higher is used.

2) A protective pipe of a double structure is used. That is, the protective pipe is constituted of a ceramic-made outer protective pipe and an inner protective pipe contained in the inside thereof, and the inner protective pipe is constituted of a high heat-conductive front protective pipe packed with a heat-resisting ceramic and a low heat-conductive rear protective pipe of a heat-shielding structure forming an air layer at the outside thereof.

By constructing the inner protective pipe as described above, the heat capacity of the front protective pipe can be constructed to be small by restraining the heat transfer from the front protective pipe to the rear protective pipe, and also the responsiveness can be improved by increasing the heat-receiving amount of the front protective pipe from a material to be measured such as a molten metal, etc., to increase the speed of the following up property to a temperature such as the temperature of a molten metal, etc., and as the result thereof, a thermocouple-type temperature-detecting device having a high responsiveness and a high reliability can be provided.

3) The invention has a ceramic-made outer protective pipe and a ceramic-made front protective pipe fixed to the inside of the above-described protective pipe via a 1st fixing member such that the closed head portion is projected from the outer protective pipe.

4) Also, heat-resisting ceramic-made fillers are packed in the inside if the front protective pipe and further the front protective pipe has a pair of alloy element wires each having a different composition, which are connected to each other at the above-described head portion to constitute a temperature measuring portion. Also, the end potion of an open form at the opposite side of the above-described front protective pipe to the above-described head portion is sealed by a heat-resisting glass-made sealing member.

5) Also, a hollow rear protective pipe is extended via a 2nd fixing member to the outer periphery of the above-described end portion of an open form of the front protective pipe and the rear protective pipe is disposed in the inside of the above-described outer protective pipe via an air layer (with an interval).

Also, the element wires of the thermocouple extended from the back portion of the above-described inner protective pipe are extended to the outside from the back portion of the rear protective pipe passing through the inside of the above-described rear protective pipe, and the element wires are connected to a temperature measurement apparatus and a display apparatus via compensating lead wires not shown.

A) The heat conductivity of the front protective pipe constituting the above-described inner protective pipe is constructed to be larger than the heat conductivity of the above-described rear protective pipe.

B) The above-described front protective pipe is constituted of a material made of $Si_3N_4$ as the main constituent. Also, the rear protective pipe extended to the inside of the above-described outer protective pipe is constituted of stainless steel, a material made of $Si_3N_4$ as the main constituent or as a material made of $Al_2O_3$ as the main constituent.

C) The above-described outer protective pipe has a multilayer structure made of at least two kinds of materials, and is formed in laminated layer structure formed by alternately laminating a 1st layer made of $Si_3N_4$ as the main constituent and a 2nd layer made of $Si_3N_4$ as the main constituent and containing from 10 to 40% by volume BN in a concentric circle form or a vortex form in a closely stuck state each other, and the above-described 2nd layer is formed as the outermost layer.

D) The heat-resisting ceramic, which is the filler packed in the above-described inner protective pipe, is made of $Si_3N_4$, MgO, and aluminum phosphate.

E) The above-described 1st fixing member of fixing the inner protective pipe and the outer protective pipe is constructed of ceramic fibers of SiC or $Al_2O_3$ and at least one kind of an inorganic glass selected from a $ZrO_2$-base glass, an $Al_2O_3$-base glass, and an $SiO_2$-base glass.

F) The above-described 2nd fixing member of fixing the front protective pipe and the rare protective pipe constituting the inner protective pipe is constituted of at least one kind of an inorganic glass selected from a $ZrO_2$-base glass, an $Al_2O_3$-base glass, and an $SiO_2$-base glass or at least one kind of a heat-resisting ceramic selected from $Si_3N_4$, MgO, and aluminum phosphate.

G) The above-described alloy element wires forming the thermocouple are constituted of W—Re element wires so that a particularly high temperature can be measured.

Because the thermocouple-type temperature-detecting device of a high-speed responsiveness of the invention is constituted as described above, the heat received at the head portion of the above-described protective pipe having formed a temperature-measuring portion or a temperature-sensitive portion from a material to be measured such as a molten metal, etc., is hard to be transferred to the rear protective pipe and as the result thereof, the heat capacity of the front protective pipe becomes small. Therefore, the heat given by the contact of the temperature-sensitive portion with a material to be measured quickly raises the temperature of the front protective pipe to immediately follow up to the temperature of the material to be measured, whereby the temperature-measuring responsiveness can be improved.

Also, because the outer protective pipe protecting the inner protective pipe is constituted of a multilayer laminated structure using at least two kinds of materials, cracks caused by a thermal shock do not progress to the inside at a stretch but are stopped at the portion of the boundary layer between the layers of the laminated layer structure. That is, to break the protective pipe, a large breaking energy is required, whereby the life of the outer protective pipe is improved and thus the inner protective pipe can be effectively protected by the outer protective pipe.

Also, because in the invention, the outermost layer of the outer protective pipe is constituted of silicon nitride containing BN, it becomes possible to increase the contact angle formed by a molten metal to the outer surface of the outer protective pipe, a molten metal repelling phenomenon that the outer surface of the outer protective pipe repels well a molten metal occurs, whereby attaching of the molten metal to the outer surface of the outer protective pipe is prevented and the durability thereof can be improved.

DETAILED DESCRIPTION OF THE INVENTION

Figure 1:
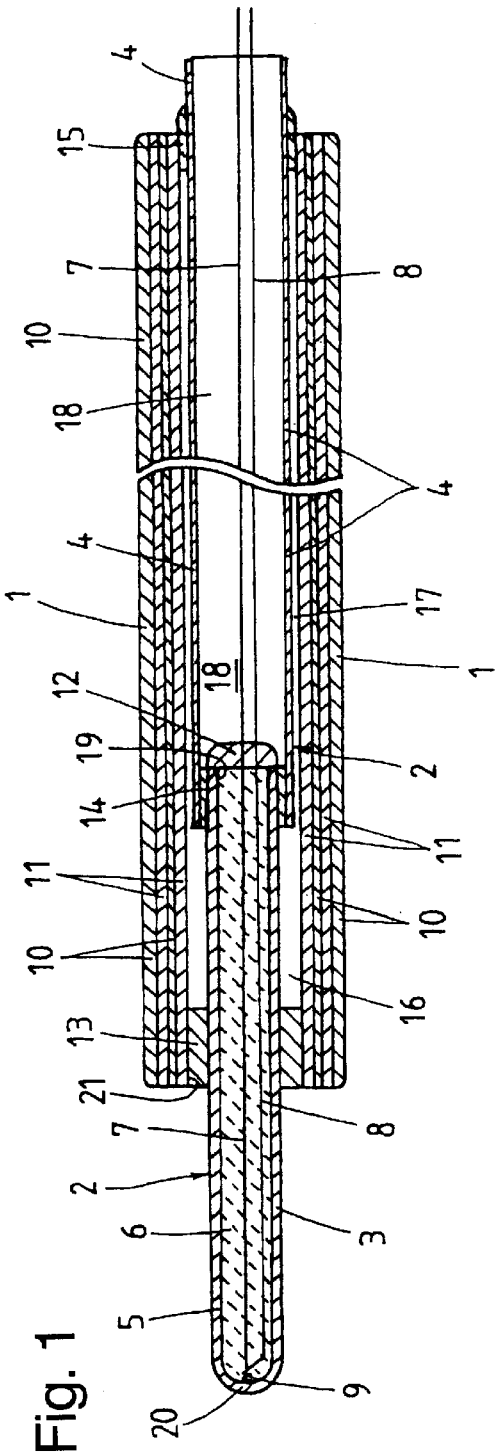
FIG. 1 is a cross-sectional view showing an embodiment of the thermocouple-type temperature-detecting device of a high-speed responsiveness of the invention.
Figure 2:
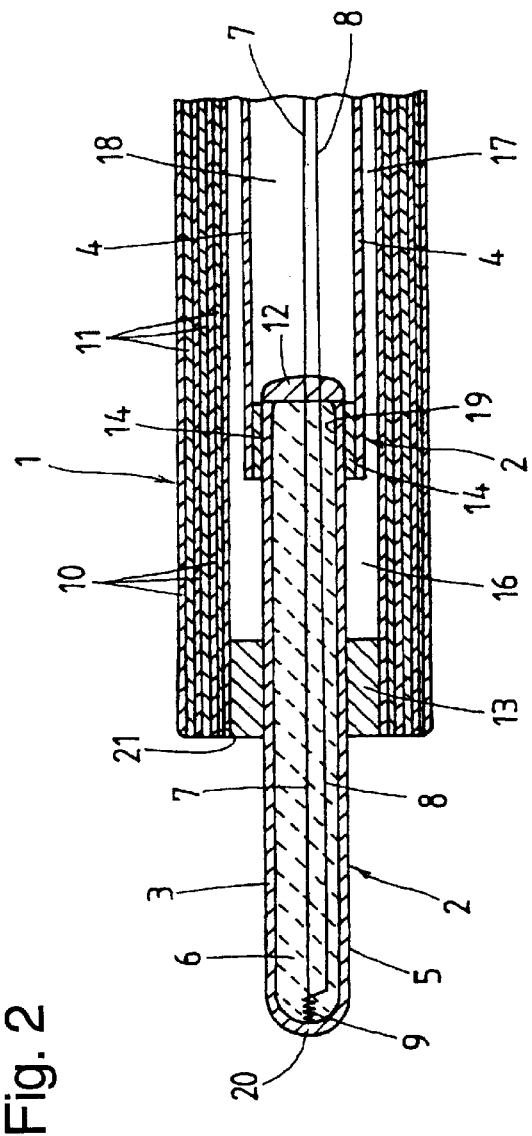
FIG. 2 is an enlarged cross-sectional view showing the head portion of the thermocouple-type temperature-detecting device of FIG. 1.

Then, the examples of the high-speed responsive thermocouple-type temperature-detecting device of the invention are explained by referring to the accompanying drawings.

The main portions of the high-speed responsive thermocouple-type temperature-detecting device of the invention are constituted of a ceramic-made outer protective pipe 1 and an inner protective pipe 2 fixed to the inside of the outer protective pipe 1 by a fixing member 13 (the 1st fixing member) and a fixing member 15 (the 3rd fixing member).

The inner protective pipe 2 is constituted of a front protective pipe 3 having a head portion 5 and a rear protective pipe 4 extending to the back of the axial direction of the front protective pipe 3 and fixed by a fixing member 14 (the 2nd fixing member).

The front end portion of the outer protective pipe 1 and the intermediate portion of the front protective pipe 3 constituting the inner protective pipe 2 is fixed by the fixing member 13 (the 1st fixing member), between the inner surface of the outer protective pipe 1 and the outer surface of the front protective pipe 3, an air layer 16 is formed, and by the air layer 16, the heat transfer to the outer protective pipe 1 is lowered.

Also, a rear protective pipe 4 connected to the back of the front protective pipe 3 by the fixing member 14 is fixed to the rear end portion of the outer protective pipe 1 by the fixing member 15 (the 3rd fixing member), and between the outer surface of the rear protective pipe 4 and the inner surface of the outer protective pipe 1, a space is formed and a thin air layer 17 is formed to lower the heat transfer.

The head portion 5 of the front protective pipe 3 constituting the inner protective pipe 2 becomes a region of receiving a heat from a material to be measured such as a molten iron, etc. Also, in the rear protective pipe 4, a hollow portion forming an air layer 18 is formed in the inside thereof.

The front protective pipe 3 is disposed extending in the outer protective pipe 1 in the state that a part of the head portion 5 having formed a closed end portion 20 is projected from the head portion of the outer protective pipe 1, and the other end of the front protective pipe 3 opposite to the head portion 5 forms an open end portion 19.

The inside of the front protective pipe 3 is packed with a filler 6 made of a heat-resisting ceramic. Also, the open end portion 19 of the front protective pipe 3 is sealed by a heat-resisting glass-made sealing member 12. In the inside of the filler 6 of the front protective pipe 3, a pair of alloy element wires 7 and 8 (thermocouple wires) each having a different composition are disposed apart from each other and laid. These alloy element wires 7 and 8 constitute a temperature-measuring portion 9 (temperature-sensitive portion) by connecting at the head portion 5 side, furthermore, the alloy element wires 7 and 8 are disposed apart from each other, penetrate the sealing member 12 sealing the end portion of the front protective pipe 3 and pass through the portion of the air layer 18 in the rear protective pipe 4, and are so constructed that an outside temperature is not transferred thereto by the air layer 17, the rear protective pipe 4, and the air layer 18.

The heat conductivity of the front protective pipe 3 constituting the inner protective pipe 2 is larger than the heat conductivity of the rear protective pipe 4, and thus, for example, the heat received from a molten metal is hard to transfer from the front protective pipe 3 to the rear protective pipe 4, thereby the heat capacity of the front protective pipe is small. Accordingly, the front protective pipe 3 is formed to a construction that when the front protective pipe 3 is brought into contact with a molten metal, the front protective pipe immediately follows up to the temperature and the temperature measuring responsiveness is improved.

The front protective pipe 3 is constituted of a material made of $Si_3N_4$ as the main constituent. About the front protective pipe 3, at least the head portion 5 is formed by an extrusion molding machine using a ceramic material having a high heat conductivity, such as, high tenacity silicon nitride having a heat conductivity of 30 W/m·k. Also, the head portion 5 is prepared by being burnt in nitrogen of 100 atm. at 1850° C. for 4 hours.

Also, the rear protective pipe 4 extended in the inside of the outer protective pipe 1 is constituted of at least one kind of a material selected from a stainless steel, a material made of $Si_3N_4$ as the main constituent, and a material made of $Al_2O_3$ as the main constituent.

The rear protective pipe 4 is formed in a pipe form with a stainless steel having a low heat conductivity lower than that of the front protective pipe 3, for example, a heat conductivity of 17 W/m·k. Also, the back end portion of the front protective pipe 3 is fixed to the front end portion of the rear protective pipe 4 by an alumina- or silica-base adhesive, that is the fixing member 14 (the 2nd fixing member).

The outer protective pipe 1 is formed in a laminated layer structure formed by alternately or randomly sticking a 1st layer 11 composed of a material made of $Si_2N_4$ as the main constituent and a 2nd layer 10 composed of a material made of $Si_2N_4$ as the main constituent containing from 10 to 40% by volume molten metal repelling BN and laminating them in a concentric circle form or a vortex form. Also, as the outermost layer, the 2nd layer 10 containing molten metal repelling BN is disposed.

For constituting the outer preventing pipe 3 by alternately laminating the 1st layer 11 and the 2nd layer 10, a sheet of the 1st layer 11 and a sheet of the 2nd layer are prepared, and by lapping these sheets and winding up, the layers each having a different quality can be laminated in a vortex form or a cylindrical form.

The reason that the 2nd layer 10 contains molten metal-repelling BN and the content of BN is selected to be at least 10% by volume, the contact angle of a molten metal and the layer is sufficiently increases and when the content is less than the value, the necessary molten metal-repelling property is not obtained. Also, the content of BN is established to be not larger than 40% by volume for sufficiently increasing the bonding strength with the 1st layer 11.

About the Function of the Temperature-detecting Device of the Invention

Figure 3:
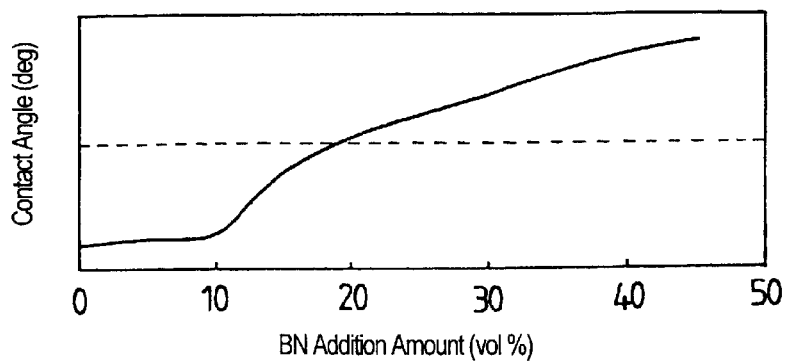
FIG. 3 is a graph showing the relation of the contact angle of a molten metal and the protective pipe by the addition amount of BN.

FIG. 3 shows the relation of the contact angle of a molten metal (molten iron) and addition amount of BN.

In the case of a material made of silicon nitride containing less than 10% by volume of BN, the contact angle was small, the molten metal-repelling phenomenon did not appear, and a state of attaching a molten metal to the 2nd layer 10 of the outer preventing pipe 1 occurred. From our experiment, it can be seen that in the material forming the 2nd layer 10 of the outer protective pipe 1, which is directly brought into contact with a molten metal, silicon nitride is required to contain at least 10% by volume BN.

Figure 4:
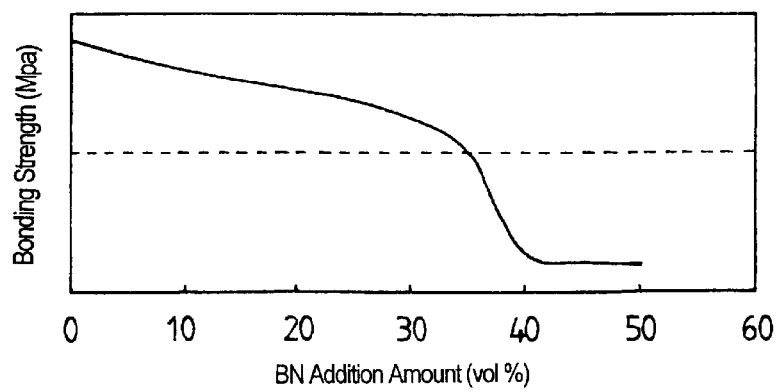
FIG. 4 is a graph showing the relation of the connection strength and the addition amount of BN.

Also, FIG. 4 shows the relation of the addition amount of BN and the bonding strength. When the addition amount of BN to a material made of silicon nitride as the main constituent is increased, the bonding strength is gradually lowered, but it can be seen that in the case of using a material having an addition amount of BN of at least 40% by volume, the bonding strength between the 1st layer 11 and the 2nd layer 12 is rapidly lowered and when the 1st layer 11 and the 2nd layer 10 are alternately laminated in multilayers, a strong lamination strength cannot be insured.

From the above-described experimental results, it can be seen that by considering the contact angle of the 2nd layer 10 of the outer protective pipe 1 and a molten metal and the bonding strength of the lamination structure, the appropriate range of the addition amount of BN to silicon nitride constituting the 2nd layer 10 of the outer protective pipe 1 is from 10 to 40% by volume.

Also, the heat-resisting ceramic constituting the filler 6 is constituted of $Si_3N_4$, MgO, and aluminum phosphate.

The fixing member 13 (the 1st fixing member) is constituted of at least ceramic fibers of SiC or $Al_2O_3$ and at least one kind of an inorganic glass selected from a $ZrO_2$-base glass, an $Al_2O_3$-base glass, and an $SiO_2$-base glass.

Furthermore, the fixing member 14 (the 2nd fixing member) and the fixing member 15 (the 3rd fixing member) are constituted of at least one kind of an inorganic glass selected from a $ZrO_2$-base glass, an $Al_2O_3$-base glass, and an $SiO_2$-base glass or a heat-resisting ceramic selected from an $Si_3O_4$-base ceramic, an MgO-ceramic, and an aluminum phosphate-base ceramic.

The alloy element wires 7 and 8 forming the thermocouple are constituted of W—Re wires each having a different composition. For example, one metal element wire 7 is made of a W-5Re wire and other metal element wire 8 is made of a W-26Re wire.

Also, the filler 6 packed in the front preventing pipe 3 is packed such that voids are not formed in the inside and also the above-described metal element wires 7 and 8 are coated with a non-oxidizable material for preventing the occurrence of corrosion by oxidizing.

The outer protective pipe 1 can be prepared as follows. For example, the thicknesses of the 1st layer 11 and the 2nd layer 10 are in the range of from 30 to 350 $\mu$m and the 2nd layer 10 is disposed as the uppermost layer. Also, the 1st layer 11 and the 2nd layer 10 are laminated such that the lamination number is in the range of from 10 to 100 layers.

In the case of preparing the outer protective pipe 1, a powder made of silicon nitride as the main constituent added with a small amount of a sintering aid was used as a fundamental component, and a sheet S1 was prepared from the powder of the above-described fundamental component using a doctor blade apparatus. Also, a sheet S2 was prepared from the powder of the above-described fundamental component added with BN as a molten metal-repelling component using a doctor blade apparatus.

Then, the sheet S1 and the sheet S2 are alternately laminated to form a layer-form and cylindrical outer protective pipe molding, and the outer protective pipe molding is secondary molded by Cold Isostatic Pressing (CIP). In this case, the thickness of the two sheets is, for example, 100 $\mu$m, and the laminated layer number is formed in 40 layers. The molding is burned in nitrogen at 1850° C. for 4 hours to prepare a sintered outer protective pipe 1.

Then, in the state that the element wires 7 and 8 are taken out from the back end portion in an open state of the front protective pipe 3, the end portion 19 in an open form is sealed by a heat-resisting glass-made sealing member 12, the end portion 19 of the front protective pipe 3 is inserted in the front end portion of the rear protective pipe 4, and the front protective pipe 3 is fixed to the rear protective pipe 4 by the fixing member 14 (the 2nd fixing member) to construct the inner protective pipe 2.

Then, the inner protective pipe 2 is inserted in the outer protective pipe 1, the front protective pipe 3 is fixed to the outer protective pipe 1 by the fixing member 13 (the 1st fixing member) in the state that the head portion 20 of the front protective pipe 3 is projected by 20 cm from the open portion 21 of the outer protective pipe 1, and also the rear protective pipe 4 is fixed to the outer protective pipe 1 by the fixing member 15 (the 3rd fixing member).

About the Performance of the Thermocouple-type Temperature-detecting Device of the Invention Using the thermocouple-type temperature-detecting device of the invention described above, the temperature measurement of a molten metal (molten iron) of 1450° C. was carried out.

For comparing the high-speed responsive thermocouple-type temperature-detecting device of the product A of the invention with a thermocouple-type temperature-detecting device of the product B of prior art, as the product B of prior art, a temperature-detecting device wherein a protective pipe is a laminated layer structure was prepared.

Figure 5:
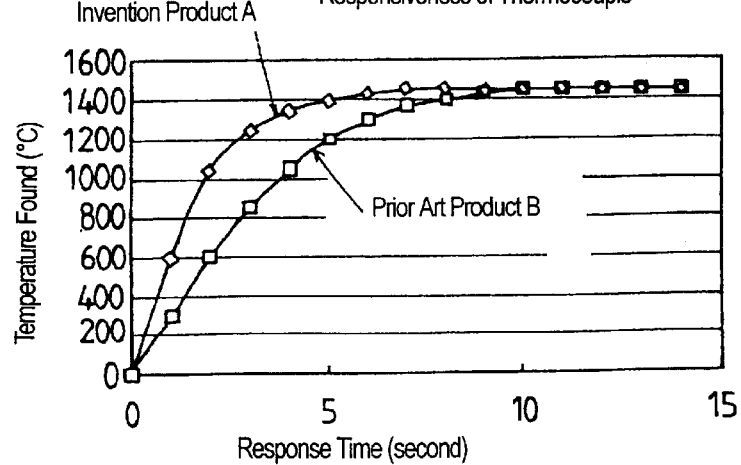
FIG. 5 is a graph of comparing the temperature-measuring responsiveness of the thermocouple-type temperature-detecting device of the invention and that of a thermocouple-type temperature-detecting device of prior art.
Figure 6:
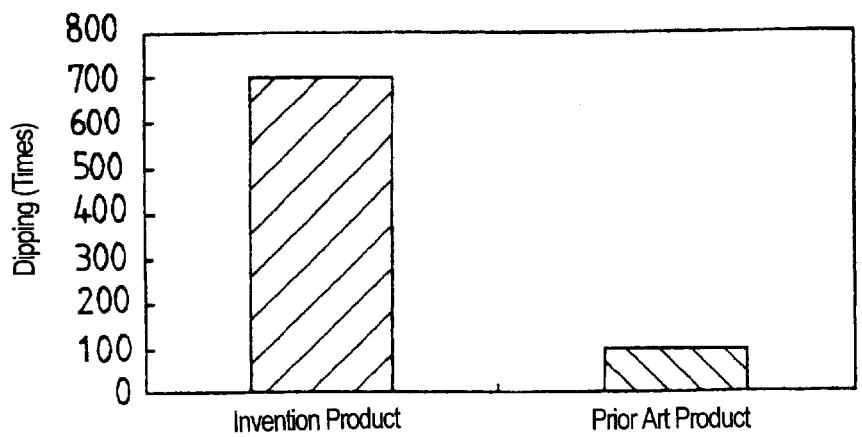
FIG. 6 is a graph comparing the durability by the temperature-measuring times of the thermocouple-type temperature-detecting device of the invention and that of a thermocouple-type temperature-detecting device of prior art.
Figure 7:
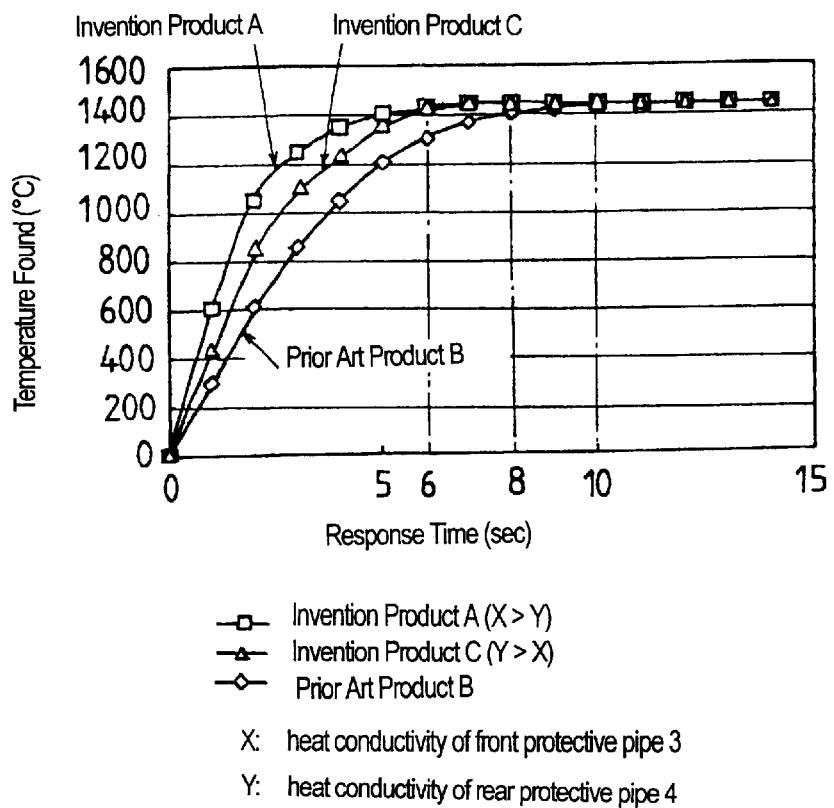
FIG. 7 is a graph comparing the temperature-measuring responsiveness of the thermocouple-type temperature-detecting device of the invention and that of a thermocouple-type temperature-detecting-element of prior art in the case of considering the heat conductivities of the front protective pipe and the rear protective pipe of the thermocouple-type temperature-detecting device of the invention.

The results of comparing the product A of the invention and the product B of the prior art are shown in FIG. 5 to FIG. 7.

As shown in FIG. 5, in the product A of the invention, the time until the electromotive force was stabilized was a short time as 6 seconds.

Also, as shown in FIG. 6, it was confirmed that when the product A of the invention was dipped about 500 times in a molten metal (molten iron), the temperature of the molten metal could be measured. Also, after repeatedly dipping the product of the invention in the molten metal about 500 times, neither cracks nor attaching of the slug occurred on the outer protective pipe 1.

On the other hand, as shown in FIG. 5, in the product B of prior art, the time until the electromotive force was stabilized was about 10 seconds, which was about twice that of the product A of the invention. Also, as shown in FIG. 6, in the product B of prior art, when the product was dipped in a molten metal about 100 times, the temperature of the molten metal could be measured but when the dipping was repeated more than about 100 times, the temperature measurement became impossible by the occurrence of damage of the thermocouple.

Also, the high-speed responsive thermocouple-type temperature-detecting devices of the product A and the product C of the invention, wherein the heat conductivity X of the front protective pipe 3 and the heat conductivity Y of the rear protective pipe 4 were different from each other, were prepared, and the temperature-measurement responsivenesses of the products A and C for a molten metal were tested.

The product A of the invention is a type that the heat conductivity of the front protective pipe 3 is larger than the heat conductivity Y of the rear protective pipe 4. Also, the product C of the invention is a type that the heat conductivity X of the front protective pipe 3 is larger than the heat conductivity of the rear protective pipe 4.

These results are shown in FIG. 7. As is seen from the figure, in the product A of the invention, the time until the electromotive force is stabilized is about 6 seconds as described above. On the other hand, in the product C of the invention, the time until the electromotive force is stabilized is about 8 seconds. From the results, it can be seen that in thermocouples, the temperature measurement responsiveness is better when the heat conductivity X of the front protective pipe 3 is larger than the heat conductivity Y of the rear protective pipe 4.

Since the high-speed responsive thermocouple-type temperature-detecting device of the invention is constructed as described above, by dividing the inner protective pipe 2 inserted into the outer protective pipe 1 having an improved durability into a front protective pipe 3 and a rear protective pipe 4, also constructing the head portion of the from protective pipe 3 such that the heat from a material to be heat-measured is liable to be transferred, increasing the heat-receiving amount of the head portion of the front protective pipe, and constructing the rear protective pipe 4 as a heat-shielding structure of a multilayer construction containing an air layer 18, the heat-measurement responsiveness is improved and the durability is improved to make it possible to repeating use of many times.

What is claimed is:

1. A thermocouple temperature-detecting device comprising:
    a ceramic-made outer protective pipe having an outermost layer of a material mainly comprising $Si_3N_4$ and containing 10–40 vol % of BN;
    a first fixing member;
    a ceramic-made front protective pipe fixed to the inside, at a front end portion, of the outer protective pipe by the first fixing member in a manner such that a closed end head portion of the front protective pipe is projected to an outside of the outer protective pipe;
    a heat-resisting ceramic filler packed in an inside of the front protective pipe;
    a rear protective pipe fixed to an open end portion of the front protective pipe opposite the closed end head portion; and
    a pair of alloy element wires having different respective compositions, which are laid in the filler and constitute a temperature-measuring portion, the wires connect at a side of the closed end head portion.

2. The thermocouple temperature-detecting device according to claim 1, wherein the front protective pipe is constructed of a material made of $Si_3N_4$ as a main constituent.

3. The thermocouple temperature-detecting device according to claim 1, wherein the outer protective pipe is formed in a laminated layer structure formed by alternately laminating in a closely stuck state a first layer composed of a material made of $Si_3N_4$ as a main constituent, and a second layer comprised of a material made of $Si_3N_4$ as a main constituent and containing from 10 to 40% by volume BN in a concentric circle form or a vertex form, and the second layer is disposed as the outermost layer.

4. The thermocouple temperature-detecting device according to claim 1, wherein the filler includes $Si_3N_4$, MgO, and aluminum phosphate.

5. The thermocouple temperature-detecting device according to claim 1, wherein the first fixing member includes ceramic fibers of SiC or $Al_2O_3$, and an inorganic glass selected from a $ZrO_2$-base glass, an $Al_2O_3$-base glass, and an $SiO_2$-base glass.

6. The thermocouple temperature-detecting device according to claim 1, wherein the alloy element wires are constructed of W—Re element wires.

7. The thermocouple temperature-detecting device according to claim 1, wherein a heat conductivity of the front protective pipe is greater than a heat conductivity of the rear protective pipe.

8. The thermocouple temperature-detecting device according to claim 7, wherein the rear protective pipe is constructed of a material selected from stainless steel, a material made of $Si_3N_4$ as a main constituent, and a material made of $Al_2O_3$ as a main constituent.

9. The thermocouple temperature-detecting device according to claim 1, further comprising:
    a heat-resisting glass-made sealing member sealing an open end portion of the front protective pipe, opposite the closed end head portion; and
    a second fixing member
    wherein the rear protective pipe is fixed to an outer periphery at the open end portion of the front protective pipe by the second fixing member, an inside thereof disposed in the outer protective pipe being formed as an air layer through which the alloy element wires penetrate.

10. The thermocouple temperature-detecting device according to claim 1, wherein the second fixing member is constructed of an inorganic glass selected from a $ZrO_2$-base glass, an $Al_2O_3$-base glass, and an $SiO_2$-base glass, or a heat-resisting ceramic selected from an $Si_3N_4$-base ceramic, an MgO-base ceramic, and an aluminum phosphate-base ceramic.

11. A thermocouple temperature-detecting device comprising:
    a first ceramic pipe, having an outer layer comprising $Si_3N_4$ and containing 10–40 vol % of BN;
    a first fixing member;
    a second ceramic pipe fixed to an inside of the first ceramic pipe by the first fixing member;
    a heat-resisting ceramic filler packed in an inside of the second ceramic pipe; and
    a pair of alloy element wires in the filler for measuring temperature.

12. A thermocouple temperature-detecting device comprising:
    a ceramic-made outer protective pipe having an outermost layer of a material mainly comprising $Si_3N_4$ and containing 10–40 vol % of BN,
    an inner protective pipe fixed to an inside of the outer protective pipe, and
    a pair of alloy element wires in the inner protective pipe for measuring temperature.

* * * * *